United States Patent [19]

Nozaki

[11] Patent Number: 5,365,698
[45] Date of Patent: Nov. 22, 1994

[54] DOOR GLASS FUN FOR AUTOMOBILE

[75] Inventor: Masahioro Nozaki, Nakashima, Japan

[73] Assignee: Toyoda Gosei Co., Ltd., Nishikasugai, Japan

[21] Appl. No.: 93,643

[22] Filed: Jul. 20, 1993

[30] Foreign Application Priority Data

Aug. 28, 1992 [JP] Japan ................. 4-066304[U]

[51] Int. Cl.$^5$ ................................................ E06B 7/16
[52] U.S. Cl. ................................. 49/441; 49/489.1
[58] Field of Search ................. 49/414, 440, 489.1

[56] References Cited

U.S. PATENT DOCUMENTS

| | | | |
|---|---|---|---|
| 4,785,584 | 11/1988 | Kisanuki et al. | 49/441 |
| 4,800,681 | 1/1989 | Skillen et al. | 49/441 X |
| 4,910,919 | 3/1990 | Kisanuki et al. | |
| 4,920,699 | 5/1990 | Nagata et al. | 49/441 |
| 4,934,101 | 6/1990 | Hannya et al. | 49/441 X |
| 5,086,588 | 2/1992 | Nakano et al. | |
| 5,159,781 | 11/1992 | Glossop, Jr. et al. | 49/441 X |

FOREIGN PATENT DOCUMENTS

| | | |
|---|---|---|
| 43821 | 2/1988 | Japan ................. 49/441 |
| 62-222920 | 9/1988 | Japan . |

Primary Examiner—Philip C. Kannan
Attorney, Agent, or Firm—Cushman, Darby & Cushman

[57] ABSTRACT

A flush-surface type door glass run for automobile is provided which is adapted into a channel 17 of a door frame 11 having a bottom portion 12 and a pair of side walls 13 and 14 each having an engaging projections 15 and 16. The side walls form a U-shaped section together with the bottom portion 12 in which a door glass 19 is fitted into the channel 17 at a position offset from the center of the channel 17 of the door frame. The door glass run includes a bottom portion 2, side walls 3 and 4 integrally connected to the bottom portion 2, engaging lips 5 and 6 which integrally extend from base of the side walls 3 and 4 toward the engaging projections 15 and 16 of the door frame 11, respectively. The outer side wall 3 is in contact with the outer side wall 13 of the door frame 11 and has a thin-walled portion which extends from the engaging projection 15 to an opening 18 at the distal end thereof so that a space 10 is defined between the door glass 17 and the outer side wall 3 of the glass run 1. The space is adapted to accommodate an outer sealing lip 7 which extends from the opening 18 at the distal end of the outer side wall 3 of the glass run 1 when a door glass 19 is fitted to the glass run 1.

3 Claims, 2 Drawing Sheets

DOOR GLASS FUN FOR AUTOMOBILE

The priority application, Japanese Utility model Application No. Hei 4-066304, filed on Aug. 28, 1992 is hereby incorporated hereinto by this reference.

BACKGROUND OF THE INVENTION

The present invention relates to a glass run which is mounted on a door frame for sealing the end edge of a door glass and, more particularly, to a flash-surface type glass run in which the distance between the outer surface of a door frame and the door glass surface is reduced.

DESCRIPTION OF RELATED ART

The door frame of automobile is, for example, in the form shown in FIG. 1. A door glass run 1 is mounted on the door frame 11 so that a door glass 19 can be opened and closed in a vertical direction. A conventional flush-surface type glass run which is mounted on the door frame is illustrated in FIG. 4.

In FIG. 4, there is shown a sectional view of an automobile door taken along the line 4—4 in FIG. 1. A glass run 41, is formed of a rubber or a synthetic resin such as vinyl chloride and is molded by the extrusion molding method. The glass run 41 comprises a glass run bottom portion 42, and outer side wall 43, an inner side wall 44, which are integrally connected to the bottom portion 42, an outer side sealing lip 47 and an inner side sealing lip 48, each lip having an end portion which is curved toward the door glass 19 from the open side of both side walls 43 and 44.

In order to prevent the glass run from being disengaged from the door frame 51, the door frame 51 is formed with outer and inner side engaging projections 53 and 54 at the ends of the side walls. The glass run 41 is formed with outer and inner side engaging lips 45 and 46 which project from the outer and inner side walls 43 and 44 toward the detent projections 55 and 56, respectively, for preventing the glass run 41 from moving toward the opening.

The flush-surface type glass run has a feature that the door glass is to be disposed at an outermost position relative to the door frame. The door glass 19 is thus fitted into the glass run 41 at a position offset outwardly of the automobile. Therefore, the outer side sealing lip 47 of the glass run 41 is formed smaller while the inner side seal lip 48 is formed larger and longer. The upper portions of the glass run and the door frame, as viewed in FIG. 4, will be referred to as "bottom portions" since these portions are generally referred to as bottom portions of a groove, with respect to the opening of the groove.

Since the door frame 51 is thick at the position where the engaging lip 45 of the outer side wall 43 is engaged therewith and that the outer side sealing lip 47 of the glass run 41 projects inwardly, that is, toward the bottom portion 42 of the glass run from the outer side wall 43 of the glass run 41, the distance between the door glass 19 and the outer surface of the door frame is undesirably large.

In order to reduce the above-mentioned distance, a glass run has been proposed as disclosed in U.S. Pat. No. 5,086,588 and No. 4,910,919, wherein the outer side wall of the door frame is made thinner and the outer side sealing lip is projected beyond the front end of the outer side of the door frame. This type of glass run has disadvantages in that externally exposed areas of the glass run are larger and the sealing performance is lowered, since the base of the sealing lip cannot be made any thicker. Further, the sealing lip along which the door glass slides may be reversed outwardly of the automobile and rolled-up when the door glass is opened.

SUMMARY OF THE INVENTION

The door glass run of the present invention overcomes the above mentioned problems.

It is, therefore, an object of the present invention to provide a flush-surface type glass run for automobile which ensures an improved flush surface, better appearance and excellent aerodynamic characteristics.

In order to accomplish the above mentioned object, the present invention provides a flush-surface type door glass run for an automobile which is fitted into a channel of a door frame having a bottom portion and a pair of side walls, each side wall having engaging projections which form a Y-shaped section together with the bottom portion. A door glass is fitted into the channel at a position offset from the center of the channel of the door frame. The glass run comprises a bottom portion, side walls integrally connected to the bottom portion, engaging lips which integrally extend from the base of the side walls toward the engaging projections of the door frame, respectively. The outer side wall of the glass run is in contact with the outer side wall of the door frame and is thin-walled from the engaging projection to an opening at the distal end thereof so that a spaced is defined between the door glass and the outer side wall of the glass run. The space is capable of accommodating an outer sealing lip which extends from the opening at the distal end of the outer side wall of the glass run when a door glass is fitted to the glass run.

DESCRIPTION OF THE PRESENTLY PREFERRED EXEMPLARY EMBODIMENTS

The present invention will be described with reference to the drawings.

Figure 1:
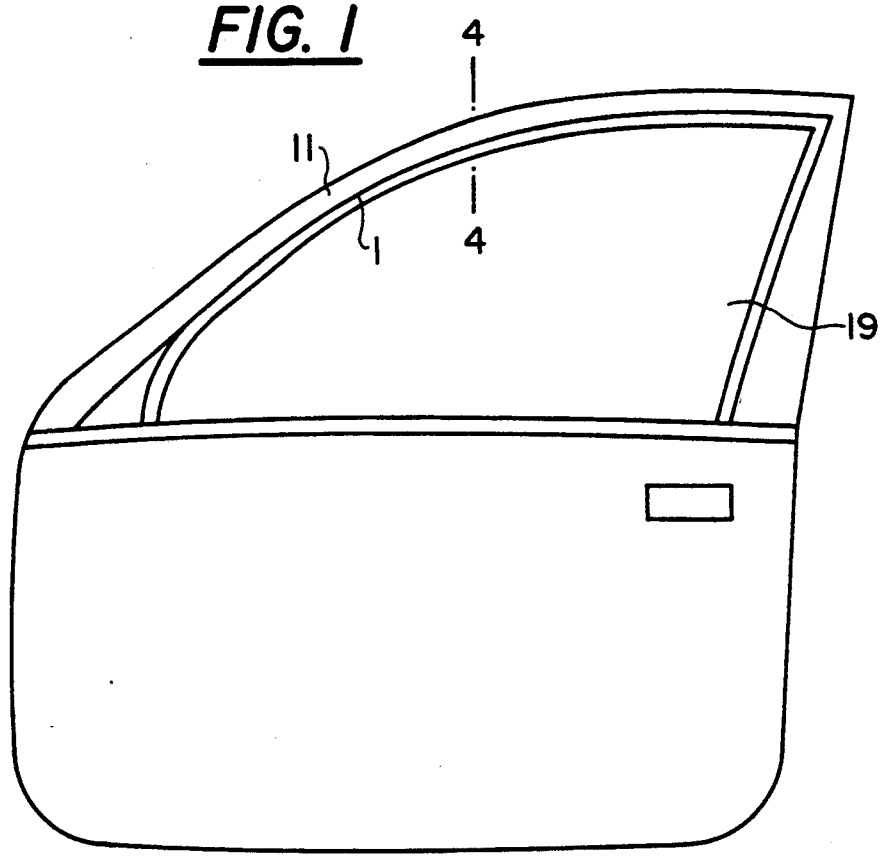
FIG. 1 is a front view of a door of an automobile showing a glass run attached thereto.
Figure 2:
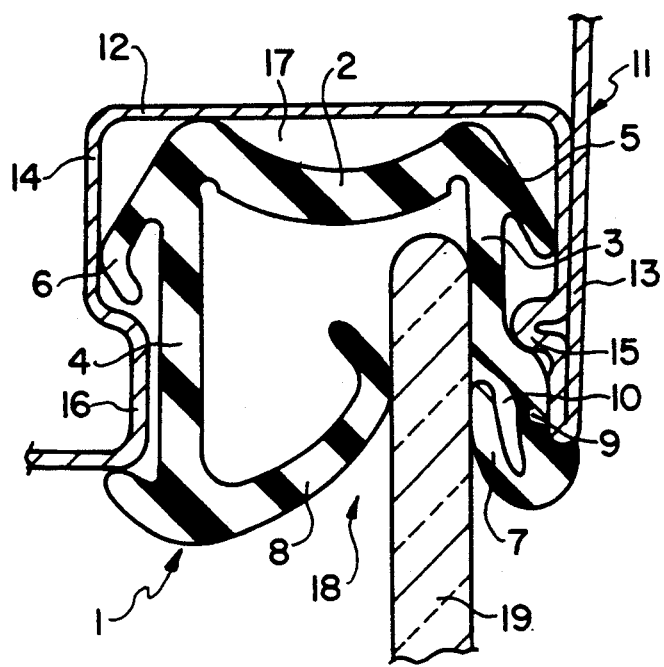
FIG. 2 is a sectional view of a first embodiment of a glass run mounted on a door frame, provided in accordance with the present invention.

In FIG. 2, a door glass run of the present invention is shown. A glass run 1 is fitted in the door frame 11 which is substantially U-shaped. The door frame 11 comprises a bottom portion 12 and outer and inner side walls 13 and 14. The outer side wall 13 is formed with an engaging projection 15 in the vicinity of the center thereof, that is, at a position slightly closer to the opening as shown in FIG. 2, by bending the flat outer side wall 13. The projection 15 projects from the outer side wall 13 by a length which is about one to 1.5 times the thickness of a side wall of the glass run 1. The inner side wall 14 includes an engaging portion 16 which projects outwardly (rightwardly as viewed in FIG. 2) in the vicinity of the opening of the frame 11.

The glass run 1 is fitted into the door frame 11 so that a glass run bottom portion 2 is in contact with the bottom portion 12 of the frame 11 and outer and inner side walls 3 and 4 of the glass run are in a vertical position. The outer and inner side walls 3 and 4 include outer and inner sealing lips 7 and 8 at the front end thereof. The sealing lips 7 and 8 project toward the door glass 19 and the glass run bottom 2, and contact the door glass 19. Since the door glass is disposed in the frame so that it is offset in an outer direction, the outer side sealing lip 7 is made shorter while the inner side sealing lip 8 is made longer and larger. Both of the sealing lips 7 and 8 slightly project beyond the front ends of the outer and inner side walls 3 and 4 of the door frame in such a manner that they cover the front ends. However, the outer side sealing lip 7 does not project outwardly from the front end of the outer side wall 13 of the outer side door frame 11, so that the outer surface is made as flush as possible.

An outer side engaging lip 5 projects toward the outer side engaging projection 15 of the outer side wall 13 of the door frame 11 from the base of the outer side wall 3 of the glass run 1. Similarly, an inner side engaging lip 6 projects toward the inner side engaging projection 16 formed on the inner side wall 14 of the door frame 11 from the base of the inner side wall 4.

The lower part of the outer side wall is preferably a thinned-walled portion 9 which extends along the outer side wall 13 of the door frame 11 from the engaging projection 16 to the front end of the outer side wall is so that a space 10 is formed between the door glass 19 and the outer side wall 3. The outer sealing lip 7 is accommodated in the space 10 when the door glass 19 is fitted between the outer and inner lips 7 and 8.

Figure 3:
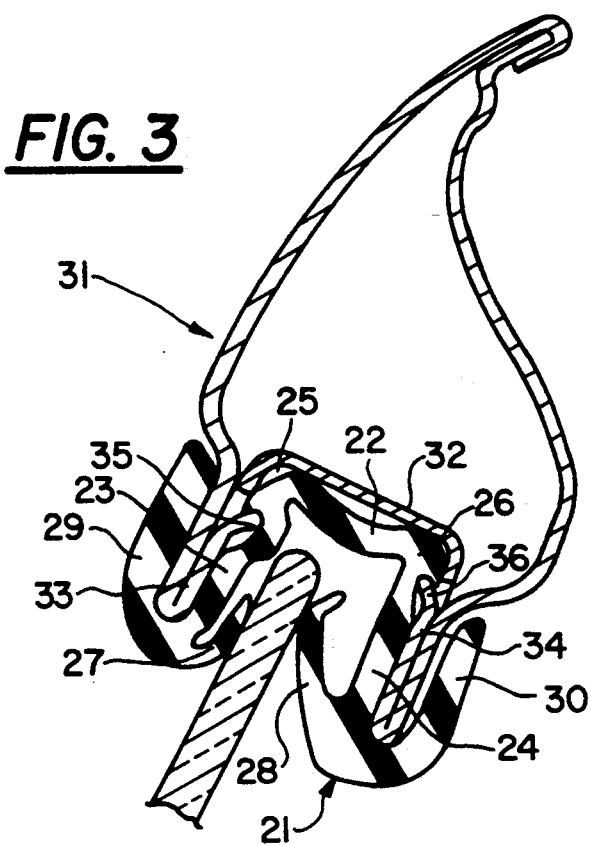
FIG. 3 is a sectional view of a second embodiment of the glass run mounted on a door channel, provided in accordance with the present invention.
Figure 4:
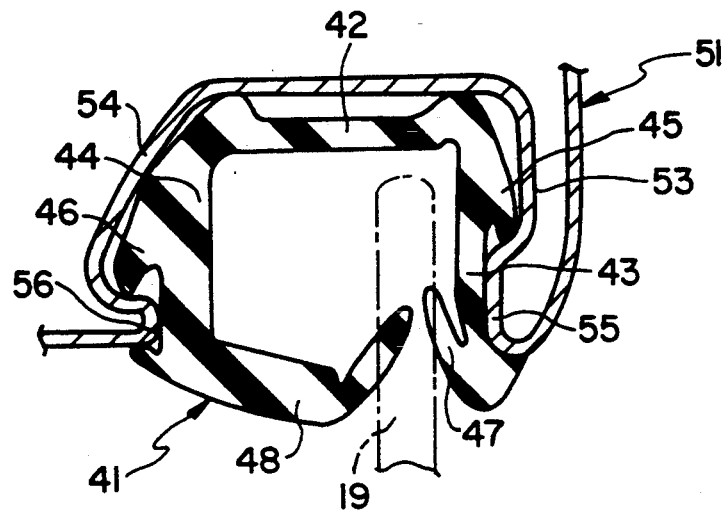
FIG. 4 is a sectional view of a conventional glass run mounted on a door frame.

In FIG. 3, a second embodiment of the present invention is shown. A glass run 21 comprises a glass run bottom portion 22, an outer side wall 23, an inner side wall 24, an outer sealing lip 27 and an inner sealing lip 28 which are substantially identical to those of the first embodiment. Molding lips 29 and 30 extend from the side walls 23 and 24 respectively, opposite sealing lips 27 and 28, respectively. The molding lips 29 and 30 extend from the front ends of the outer and inner side walls of the door frame 31, on the sides opposite the sealing lips 27 and 28, respectively. The molding lips 29 and 30 cover the front ends of the outer and inner side walls 33 and 34. The molding lip 29 is adhered to the outer surface of the outer side wall 33 of the door frame 31.

In the second embodiment, a portion of the door frame on which the glass run is mounted, which is generally referred to as a channel, is simplified in structure. The outer and inner side walls 33 and 34 are formed with the outer and inner engaging projections 35 and 36 which are cut and projected toward the door glass from the outer and inner side walls 33 and 34 and are bent at the distal ends thereof to provide covering members which extend along the outer and inner walls 33 and 34. The door frame 31 is bulged so that the width between the side walls 33, 34 above the bottom portion 32 is increased and the door frame 31 is narrowed at remaining portions thereof. The glass run is formed in such a manner that the molding lips are substantially flush with the door frame with the outer and inner molding lips 29 and 30 of the glass run 21, covering the outer and inner side walls 23 and 30 of the door frame 31.

In the second embodiment, the outer and inner engaging lips 25 and 26 are triangular shaped, small protuberances projecting from the base portion of the side walls 23 and 24. The outer and inner engaging projections 35 and 36 of the door frame 31 are provided on the outer and inner side walls 33 and 34 in the vicinity of the door frame bottom portion 32.

It is apparent from the foregoing description that since the distance between the outer door frame and the door glass is made very small, a flush surface is obtained, the appearance is improved, the aerodynamic characteristics at high speed running are improved and noise due to turbulence of air caused at a stepped portion is reduced. The outer sealing lip of the door glass run is not made particularly longer. Since the outer sealing lip is accommodated in the space of the outer side wall, it will not be rolled up by the sliding of the glass therealong.

The door frame channel can be made smaller in the second embodiment, which reduces weight and cost.

What is claimed is:

1. A door glass run for an automobile which is adapted to be fitted into a U-shaped channel of a door frame, the door frame having a bottom portion and inner and outer side walls which define the U-shaped channel, each side wall having an engaging projection, a door glass being fitted into the channel at a position offset from a center of the channel, said door glass run comprising:

a bottom portion;

inner and outer side walls integrally connected to the bottom portion of the door glass run;

engaging lips which integrally extend from base portions of each said door glass run side walls toward the engaging projections of the frame, respectively; and inner and outer seal lips extending from free ends of said door glass run side walls for sealing against the door glass, said outer side wall of said door glass run being in contact with the outer side wall of the door frame, said outer side wall of the door glass run being thin-walled from a portion extending from the engaging projection to the distal end of the outer side wall of the door frame so as to define a space between the door glass and the outer side wall of the door glass run, said outer seal lip being accommodated within said space when the door glass is fitted to the door glass run, and an end portion of said outer seal lip being disposed inside of the U-shaped channel and generally flush with a surface of said outer side wall of the door glass run.

2. The door glass run according to claim 1, wherein said outer seal lip is shorter than said inner seal lip to accommodate the offset position of the door glass.

3. A door glass run according to claim 1, further comprising a molding lip extending from the end of the outer side wall of the door glass run opposite the seal lip, said molding lip contacting an outer surface of the outer side wall of the door frame, said outer side wall of the door frame having a recessed portion for accommodating a thickness of the molding lip, whereby the molding lip is flush with a non-recessed portion of said outer side wall of the door frame.

* * * * *